March 31, 1959 C. E. MERCIER 2,880,401
MEANS FOR CONTROLLING CRACK FORMATIONS
Filed May 21, 1956 2 Sheets-Sheet 1

Inventor
Carl E. Mercier
by Warren F. B. Lindsley
Attorney

March 31, 1959   C. E. MERCIER   2,880,401
MEANS FOR CONTROLLING CRACK FORMATIONS
Filed May 21, 1956   2 Sheets-Sheet 2
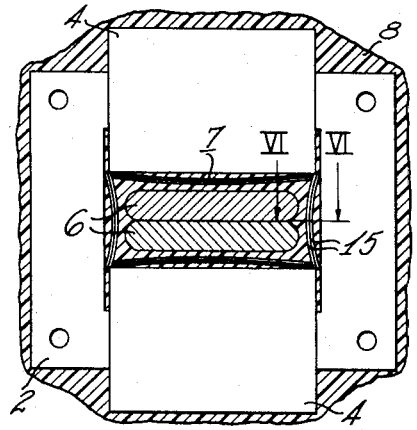
Fig. 5
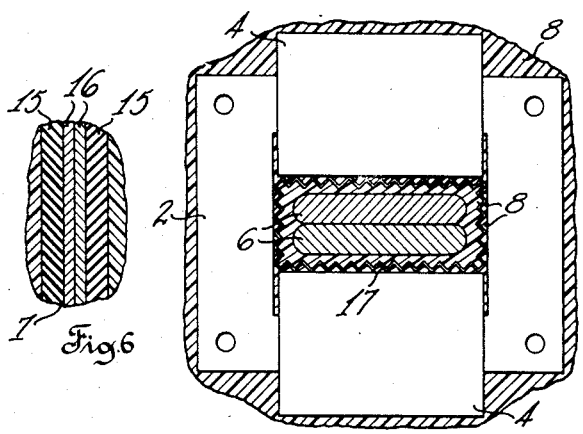
Fig. 6
Fig. 7
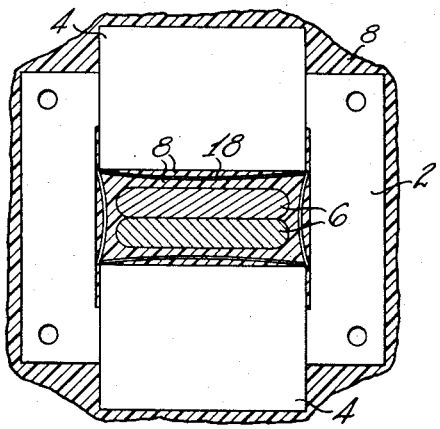
Fig. 8
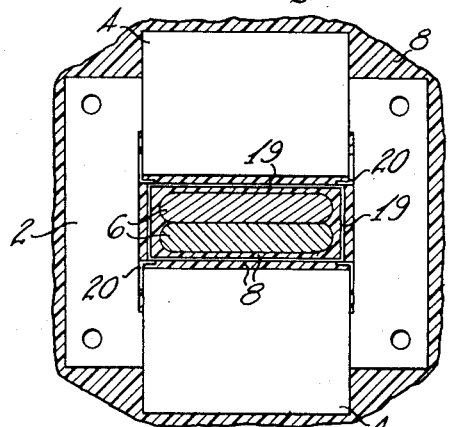
Fig. 9
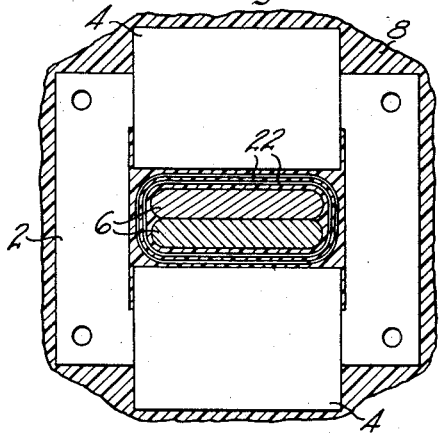
Fig. 10
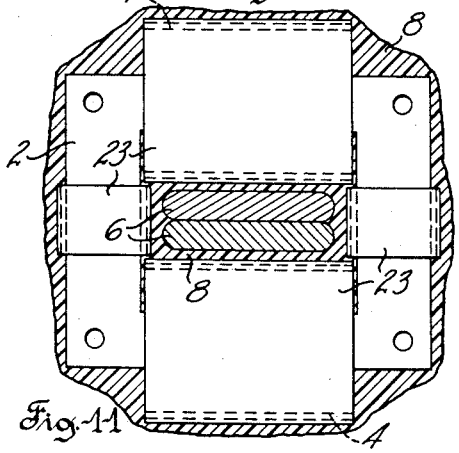
Fig. 11
Inventor
Carl E. Mercier
by Warren F. B. Lindsley
Attorney United States Patent Office 2,880,401
Patented Mar. 31, 1959

2,880,401

MEANS FOR CONTROLLING CRACK FORMATIONS

Carl E. Mercier, West Allis, Wis., assignor to Allis-Chalmers Manufacturing Company, Milwaukee, Wis.

Application May 21, 1956, Serial No. 586,250

6 Claims. (Cl. 336—96)

This invention relates to insulated electric devices and more particularly to encapsulated electric induction apparatus.

The encapsulation of electric devices such as current transformers involves the encasing of its component parts, the filling in of all the interstices between the component parts and usually the encompassing of the device to form a relatively solid, inflexible mass.

Heretofore during curing or use of an encapsulated device, shrinkage of the encapsulating material usually occurred producing faults such as radial cracks and air voids in or adjacent the encapsulating material. These faults usually caused a drop in the corona voltage level of the transformer. One cause of such faults was found to be uneven shrinkage of the casting resin during curing, polymerization or use.

The area between the primary conductor and the secondary windings of a current transformer is one of high potential electric stress. Therefore, it is important that the encapsulating material within this area cure substantially free of radial cracks and air voids.

Therefore, in accordance with the present invention a new and improved structure is provided for encapsulating an electric device. This structure comprises a first layer or collar of compressible fibrous material which may be of a particular geometrical configuration mounted around a part of the device and a second layer of insulating resin formed when in the pliable state around the first layer of material and between the first layer of material and the encapsulated device.

It is therefore one object of the present invention to provide a new and improved encapsulated electrical device.

Another object of this invention is to provide a new and improved insulating structure for encapsulating electrical devices.

A further object of this invention is to provide a new and improved thermosetting electrical insulation, which cures substantialy free of faults such as uneven shrinkage, radial cracking and air voids.

A still further object of this invention is to provide a new and improved encapsulating insulation embodying insert material to eliminate or minimize cracks which form naturally in the encapsulating material whenever temperatures develop throughout the body of the material either during curing or in actual application.

Other objects and advantages of the invention will be apparent from the following description when read in connection with the accompanying drawings, in which:

Fig. 5 is a cross sectional view of the structure shown in Fig. 4 taken along the line V—V;

Fig. 6 is an enlarged cross sectional view of the structure shown in Fig. 5, taken along line VI—VI; and Figs. 7–11, inclusive, are cross sectional views of the structure shown in Fig. 3, illustrating modifications of the thermosetting reinforcing material and embodying the invention.

Figure 2:
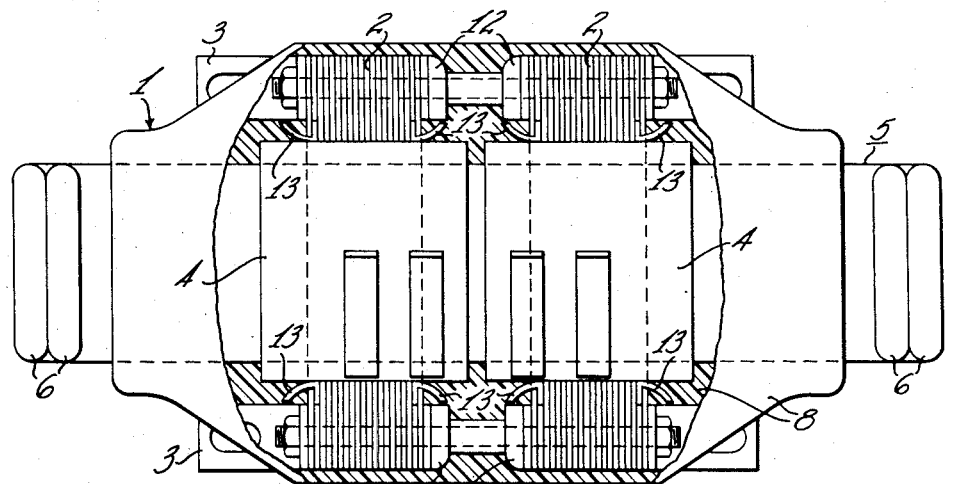
Fig. 2 is a top view partly in section of the structure illustrated in Fig. 1.
Figure 1:
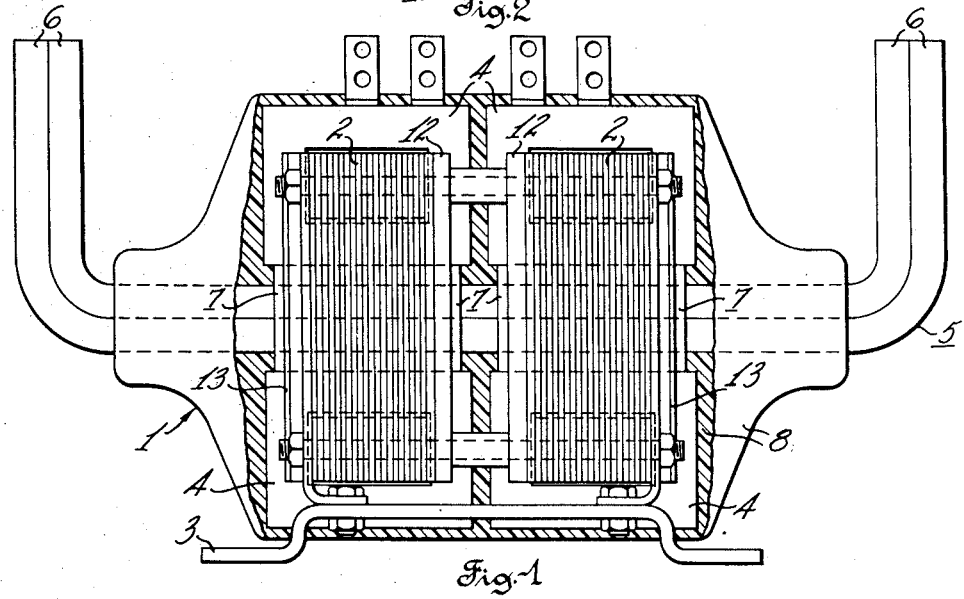
Fig. 1 is an elevational view partly in section of a current transformer embodying the present invention.

Referring more particularly to the drawings by characters of reference, Figs. 1 and 2 illustrate a high voltage through type double secondary current transformer 1 with parts of the insulation broken away and embodying one version of the present invention. Current transformer 1 comprises a pair of cores 2 mounted on a pair of brackets 3, a pair of secondary windings 4 mounted on each core 2 and magnetically coupled therewith, and a primary conductor 5 comprising a pair of U-shaped heavy duty bus bars 6.

In accordance with the structure claimed, a layer of fibrous material 7 forming a collar of a particular geometrical configuration is placed around primary conductor 5, between conductor 5 and secondary windings 4. This insert layer of material 7 is firmly held in place by a thermosetting insulating resin 8. Resin 8 when in the pliable state is formed between secondary windings 4 and core 2, and between the secondary windings 4 and primary conductor 5 to firmly hold material 7 in place, and around transformer 1 to substantially encapsulate the electrical device. After curing the resin 8 insulates and rigidly positions the secondary windings 4 and core 2 from the primary conductor 5. The material 7 may have a low adhesion to resin 8 so that resin 8 shrinks away from material 7 during cooling or curing. In this manner material 7 controls the place of occurrence of air voids and cracks, if any, and in turn, the size and number thereof.

Each modification of the present invention contemplates the forming of encapsulating resin 8 on both sides of each of the insert layers of material 7. Modifications of the geometrical configuration of material 7 in the form of closed and opened four sided figures having flat or corrugated surfaces or continuous coils of fibrous material are shown in the accompanying drawings. Although the invention discloses and claims certain geometrical configurations, nevertheless other shapes and configurations are contemplated and any number of layers of material may be used. In addition the present invention contemplates the use of any suitable thermosetting material for encapsulating the electrical device.

The insert material 7, which may be flexible and compressible, forms a jacket or collar around primary conductor 5 and when applied to a current transformer as shown in Figs. 1 to 4, inclusive, may extend beyond core 2 on one or both sides thereof. Material 7 forms a divider which breaks the layer of resinous insulating material 8 adjacent thereto up into strata in order to provide means for the stresses and strains natural to the curing process to be minimized, thus eliminating cracking and voids. Further, material 7 provides a means for the encapsulating resin to cure in smaller bodies or layers. The fully cured encapsulating body 8 has a virtually uniform density substantially free from such faults as radial cracks, uneven shrinkage and voids.

As shown in Fig. 2, filler blocks 12 are placed adjacent cores 2 to replace an equivalent amount of encapsulating resin 8 and lessen the possibility of faults in the encapsulating resin 8 by reducing the bulk thereof. Any appropriate number of filler blocks 12 may be utilized according to the size of the electrical device to be encapsulated and the distance between component parts thereof. Also shown are a plurality of corona shields 13 attached at the sharp corners of the end lamination of cores 2 in such a way as to minimize the effect of electrical stress concentrations usually found there.

Figure 3:
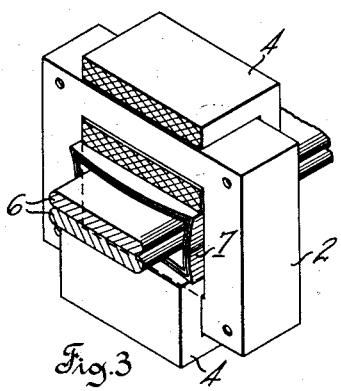
Fig. 3 is an isometric view of a single core, coil and bus bar assembly of a current transformer with a part of the secondary coil broken away to show more clearly one embodiment of the present invention.

Fig. 3 is an isometric view of a current transformer utilizing one core, coil and primary conductor assembly with a part of the secondary winding broken away to reveal the extension of the insert collar beyond the lateral edge of the core. Parts corresponding to similar parts illustrated in Figs. 1 and 2 have been given similar reference characters. Since the area between primary conductor 5 and the core and coil assembly is one of high potential stress it is important that such faults as cracking, air voids, and uneven shrinkage be prevented in this area, and the extension of the fibrous collar beyond the sides of core 2 is recommended for increasing the collar's effectiveness.

Figure 4:
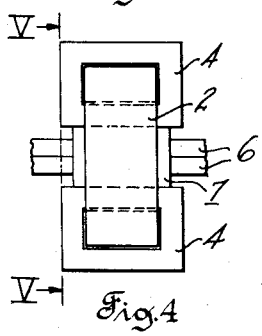
Fig. 4 is a side view of the structure shown in Fig. 3 with full secondary core assembly.

Fig. 4 is a side view of the structure shown in Fig. 3 with full coil assembly, showing the extension of fibrous insert collar 7 on both sides of core 2.

Fig. 5 illustrates a cross sectional view of Fig. 4 taken along the line V—V and Fig. 6 is an enlarged cross sectional view of Fig. 5 taken along the line VI—VI. As noted from Fig. 5, the fibrous collar 7 comprises a pair of juxtapositioned strips 15 which are arranged on all four sides of primary conductor 5 in the form of a rectangular collar. The mutually facing sides of strips 15 are coated with conductive paint or other suitable conductive material 16 as shown in Fig. 6. Each side of collar 7 is bowed in the center to allow a predetermined body of insulating resin 8 to form on each side of it. Collar 7 may comprise a continuous body or may be formed of four substantially plane members arranged to contact adjacent members at their ends to form a continuous member. Each pair of strips 15 forming one side of collar 7 touch at their respective ends to insure that their juxtapositioned conducting surfaces have the same electric potential. This is important if the strips of any one side should become separated during a curing operation. Cracks due to shrinkage in this region are avoided, for any tendency to form such cracks causes the pair of strips to part and form a void between the conducting surfaces where no corona can develop because such surfaces are kept at the same electrical potential.

Figs. 7 to 11, inclusive, illustrate a plurality of modifications of the structure shown in Figs. 3 and 4. These modifications are assumed to be cross sectional views taken along a section line similar to line V—V of Fig. 4. Like elements in Figs. 3 to 11, inclusive, have been given like reference characters.

In Fig. 7, a layer of corrugated fibrous material 17 forms a rectangular collar loosely mounted around the primary conductor 5, and the encapsulating resin 8 flows on both sides of the corrugated material. Material 17 may comprise a single strip of corrugated material or may comprise a plurality of juxtapositioned strips of material combined in the manner illustrated in Figs. 5 and 6 and coated with a conductive layer of material. The corrugated material is pliable and resilient thus yielding where necessary during curing to eliminate stresses and strains in the material.

Fig. 8 shows a further modification of the present invention and is similar to Fig. 5 except that single strips of material 18 are used. With this arrangement cracks occurring are invariably found to occur in the regions which parallel the flat sides of primary conductor 5 where the electrostatic field is uniform and the stress is low, thus keeping the corona voltage level comparatively high. Coatings such as silicone grease may but need not be used on material 18 to reduce the adherence of the encapsulating resin to the insert layers of fibrous material.

Fig. 9 shows a further modification of the present invention in which insert strips 19 are arranged in the form of a straight rectangular collar or box, and spaced away from the core and coil assembly by the use of heels 20 in order to allow insulating resin 8 to flow on both sides of the strips.

Fig. 10 is a further modification of the present invention in which a layer or a number of layers of glass cloth 22 or other similar material are spaced in ovals around the primary conductor 5 and the encapsulating resin fills the spaces between the layers of glass cloth. These layers may be concentric or substantially concentric to each other.

Fig. 11 illustrates a further modification of the present invention in which a rectangular collar around the primary conductor is formed by the inward facing sides of four rectangular collars 23 wrapped around the core and coil assemblies. These rectangular collars are loosely mounted so as to allow encapsulating resin 8 to flow on both sides of them.

Although but a few embodiments of the present invention have been illustrated and described, it will be apparent to those skilled in the art that various changes and modifications may be made therein without departing from the spirit of the invention or from the scope of the appended claims.

What is claimed is:

1. An electric device comprising a metallic member, means comprising a plurality of flexible strips of fibrous material forming a four sided collar having sides which fit loosely around said member, said sides being formed convex to said member, and a thermosetting insulating resin formed when in the pliable state between said member and said collar and surrounding said collar to substantially encapsulate said device.

2. An electric device comprising a metallic member, means comprising a flexible collar loosely mounted around said member, said collar comprising a double layer of fibrous material having mutually facing surfaces, said surfaces being coated with a layer of conductive material, and a thermosetting insulating resin formed when in the pliable state between said member and said collar and surrounding said collar to substantially encapsulate said device.

3. A current transformer comprising a core, a primary conductor inserted through said core, a secondary winding inductively associated with said core, a flexible collar comprising juxtapositioned strips of material loosely mounted around said conductor and betwen said conductor and said core and secondary winding, means comprising an electrically conductive layer of material applied to the juxtapositioned strips of material, and a thermosetting insulating resin formed when in the pliable state between said conductor and said collar and between said collar and said core and said secondary winding, said resin after curing insulating and rigidly positioning said winding and said core from said conductor.

4. A current transformer comprising a plurality of spaced cores, a primary conductor inductively coupled with said cores, secondary windings inductively coupled with said cores and said conductor, filler blocks arranged between and one adjacent each of said cores, cast resin encapsulating said current transformer, said resin insulating and rigidly positioning said windings and said cores from said conductor, and means comprising a resiliently formed collar arranged within said resin about said conductor for yielding during curing of said resin to control the size and number of air voids and cracks, said blocks replacing an equivalent amount of said resin to lessen the possibility of faults in said resin by reducing the bulk thereof.

5. A current transformer comprising a core, a primary conductor extending through and inductively coupled with said core, a secondary winding inductively coupled with said core and said conductor, corona shields arranged adjacent the corners of said core to minimize the effects of electrical stress concentrations at those points, cast resin encapsulating said current transformer, said resin insulating and rigidly positioning said winding and said core from said conductor, and means comprising a resilient collar arranged within said resin about said conductor for yielding during curing of said resin to control the size and number of air voids and cracks.

6. A current transformer comprising a pair of spaced cores, a primary conductor inductively coupled with said cores, secondary windings inductively coupled with said cores and conductor, filler blocks arranged between and one adjacent each of said cores, corona shields arranged adjacent the corners of said cores to minimize the effects of electrical stress concentrations at those points, cast resin encapsulating said current transformer, said resin insulating and rigidly positioning said windings and said cores from said conductor, and means comprising a resilient collar arranged within said resin about said conductor for yielding during curing of said resin to control the size and number of air voids and cracks, said blocks replacing an equivalent amount of said resin to lessen the possibility of faults in said resin by reducing the bulk thereof.

References Cited in the file of this patent

FOREIGN PATENTS

| | | |
|---|---|---|
| 1,758,968 | Pickard | May 20, 1930 |
| 2,222,729 | Ver Planck et al. | Nov. 26, 1940 |
| 2,618,689 | Cook | Nov. 18, 1952 |
| 2,683,766 | Cunningham | July 13, 1954 |
| 2,743,308 | Bardsley | Apr. 24, 1956 |